(12) United States Patent
Kuroishi (10) Patent No.: US 9,563,190 B2
(45) Date of Patent: Feb. 7, 2017

(54) POWER MANAGEMENT SYSTEM, ELECTRONIC APPARATUS, AND COMPUTER-READABLE MEDIUM

(71) Applicant: FUJI XEROX CO., LTD., Tokyo (JP)

(72) Inventor: Kenji Kuroishi, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 412 days.

(21) Appl. No.: 14/052,132

(22) Filed: Oct. 11, 2013

(65) Prior Publication Data

US 2014/0336839 A1    Nov. 13, 2014

(30) Foreign Application Priority Data

May 10, 2013    (JP) .................................. 2013-100207

(51) Int. Cl.
*G05B 15/02* (2006.01)
(52) U.S. Cl.
CPC ..... *G05B 15/02* (2013.01); *G05B 2219/25387* (2013.01); *G05B 2219/2642* (2013.01)
(58) Field of Classification Search
CPC ............ H02J 3/382; H02J 3/06; G06G 7/635; G05B 15/02; G05B 2219/25387; G05B 2219/2642
USPC ....................................................... 700/297
See application file for complete search history.

(56) References Cited

U.S. PATENT DOCUMENTS

| 8,904,196 B2 * | 12/2014 | Krig .................. G06F 1/206 700/293 |
| 2006/0056336 A1 * | 3/2006 | Dacosta ............ H04L 29/06027 370/328 |
| 2009/0245152 A1 * | 10/2009 | Hsu ................... H04W 52/0225 370/311 |

FOREIGN PATENT DOCUMENTS

| JP | A-2002-78246 | 3/2002 |
| JP | 2008-015799 A | 1/2008 |
| JP | 2008-171323 A | 7/2008 |
| JP | B2-4335126 | 9/2009 |
| JP | 2010-212829 A | 9/2010 |
| JP | 2011-118500 A | 6/2011 |
| JP | 2013-017264 A | 1/2013 |

OTHER PUBLICATIONS

May 31, 2016 Office Action issued in Japanese Patent Application No. 2013-100207.

* cited by examiner

*Primary Examiner* — Robert Fennema
*Assistant Examiner* — Jigneshkumar Patel
(74) *Attorney, Agent, or Firm* — Oliff PLC (57) ABSTRACT

A power management system includes an electronic apparatus including a notification unit, a recording unit, a switching unit, and a transmitting unit, a management apparatus including an apparatus control unit, and a relay apparatus relaying communication between the apparatuses. In the first mode, the notification unit notifies the management apparatus of the state of the electronic apparatus at predetermined timings or according to a change in the state. In the second mode, the recording unit records the state instead of transmitting the notification. The switching unit switches the control mode in response to an instruction from the management apparatus. Upon switching from the first mode to the second mode, the transmitting unit transmits switching information to the management apparatus. Upon reception of the switching information, the apparatus control unit switches the control mode of the relay apparatus so as to reduce the power consumption of the relay apparatus.

8 Claims, 4 Drawing Sheets

POWER MANAGEMENT SYSTEM, ELECTRONIC APPARATUS, AND COMPUTER-READABLE MEDIUM

CROSS-REFERENCE TO RELATED APPLICATIONS

This application is based on and claims priority under 35 USC 119 from Japanese Patent Application No. 2013-100207 filed May 10, 2013.

BACKGROUND

Technical Field

The present invention relates to a power management system, an electronic apparatus, and a computer-readable medium.

SUMMARY

According to an aspect of the present invention, there is provided a power management system including an electronic apparatus, a management apparatus, and a relay apparatus that relays communication between the electronic apparatus and the management apparatus. The electronic apparatus includes a notification unit, a recording unit, a switching unit, and a transmitting unit. The notification unit notifies the management apparatus of a state of the electronic apparatus at predetermined timings or in accordance with a change in the state of the electronic apparatus, in the case where a control mode of the electronic apparatus is a first mode. The recording unit records the state instead of transmitting the notification by the notification unit, in the case where the control mode is a second mode. The switching unit switches the control mode in response to an instruction from the management apparatus. The transmitting unit transmits switching information to the management apparatus in response to switching of the control mode from the first mode to the second mode which is performed by the switching unit. The management apparatus includes an apparatus control unit that switches a control mode of the relay apparatus so as to cause a power consumption of the relay apparatus to be lower than a power consumption before the switching, when the switching information transmitted by the transmitting unit of the electronic apparatus is received.

BRIEF DESCRIPTION OF THE DRAWINGS

Exemplary embodiments of the present invention will be described in detail based on the following figures, wherein.

DETAILED DESCRIPTION

Exemplary Embodiment

Figure 1:
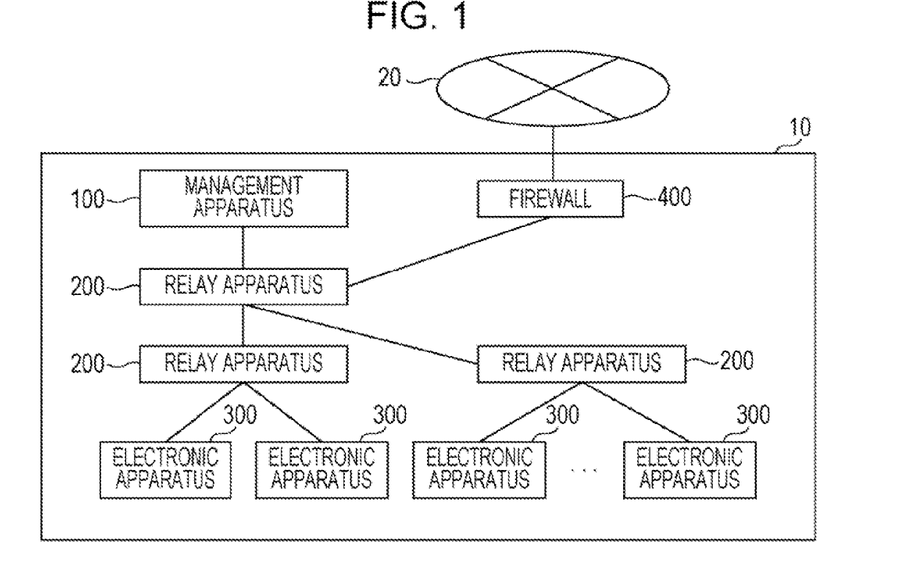
FIG. 1 is a block diagram illustrating the overall configuration of a power management system.

FIG. 1 is a block diagram illustrating the overall configuration of a power management system 10 according to one exemplary embodiment of the present invention. The power management system 10, which is configured by using a local area network (LAN) provided in an office or a building, is connected to an external network 20 such as the Internet. The power management system 10 includes at least a management apparatus 100, relay apparatuses 200, electronic apparatuses 300, and a firewall 400.

In the exemplary embodiment, these apparatuses constituting the power management system 10 are compatible with an energy management system, such as a HEMS or a BEMS. Communication in the power management system 10 is performed on the basis of a communication standard which is compatible with an energy management system, such as ECHONET Lite or IEEE 1888.

The management apparatus 100 manages the apparatuses in the power management system 10, and serves as a server in the power management system 10. The management apparatus 100 switches the control mode of each of the apparatuses in the power management system 10, and receives information, i.e., operation state data described below, indicating the state of each apparatus.

A relay apparatus 200 relays communication between the management apparatus 100 and an electronic apparatus 300. The relay apparatus 200 is, for example, a router or a hub. The relay apparatus 200 operates in either of multiple control modes. Herein, control modes indicate aspects of control of an apparatus. The control modes of the relay apparatus 200 includes at least the "normal mode" and the "power-saving mode". The power-saving mode indicates a control mode in which the power consumption is less than that in the normal mode, and is, for example, a mode in which the apparatus is in a sleep state. In the case where a relay apparatus 200 receives an instruction to turn on/off the relay apparatus 200, which is transmitted by the management apparatus 100 in a remote site, the power-saving mode may indicate a power-off state. Similarly to an electronic apparatus 300, a relay apparatus 200 has a function of transmitting operation state data described below.

An electronic apparatus 300 is an apparatus to be managed in the power management system 10. The electronic apparatus 300 is not limited to a specific apparatus, and various apparatuses may be used as an electronic apparatus 300. An electronic apparatus 300 may be, for example, an air-conditioning apparatus (such as a so-called air conditioner), a business machine (such as a facsimile, a copier, a printer, or a personal computer), a household electrical appliance (such as a refrigerator or a television), or a lighting apparatus. Similarly to a relay apparatus 200, an electronic apparatus 300 also operates in either of the control modes including the normal mode and the power-saving mode. The normal mode corresponds to an exemplary "first mode" in the present invention, and the power-saving mode corresponds to an exemplary "second mode" in the present invention.

The firewall 400 controls access from the external network 20 to the power management system 10. The firewall 400 permits or prohibits access from the external network 20 in accordance with a predetermined rule (policy).

Figure 2:
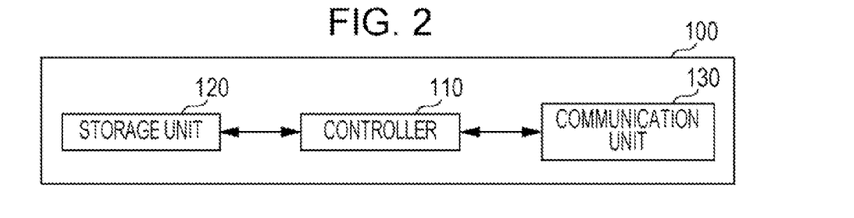
FIG. 2 is a block diagram illustrating the hardware configuration of a management apparatus.

FIG. 2 is a block diagram illustrating the hardware configuration of the management apparatus 100. The management apparatus 100 includes a controller 110, a storage unit 123, and a communication unit 130. The controller 110 controls operations of the units of the management apparatus 100. The controller 110, which includes an arithmetic processing unit such as a central processing unit (CPU) and a memory, performs control by executing programs. The storage unit 120 stores data required by the controller 110. The storage unit 120 including a storage medium such as a hard disk receives instructions to write and read data, from the controller 110. The storage unit 120 stores topology information indicating the network configuration in the power management system 10. The topology information enables the management apparatus 100 to specify how the apparatuses are connected to each other. The communication unit 130 receives/transmits data from/to the electronic apparatuses 300. The communication unit 130, which includes a network interface card (NIC) and a monitor, performs processing necessary for data communication via one or more relay apparatuses 200.

The management apparatus 100 may have a function of displaying the amount of electricity used in the power management system 10, or may have a function of causing another apparatus, such as a personal computer or a monitor, including a display unit to display the amount of electricity used. Herein, "another apparatus" may be present in the LAN, or may be present in the outside of the LAN and be connected via the external network 20.

Figure 3:
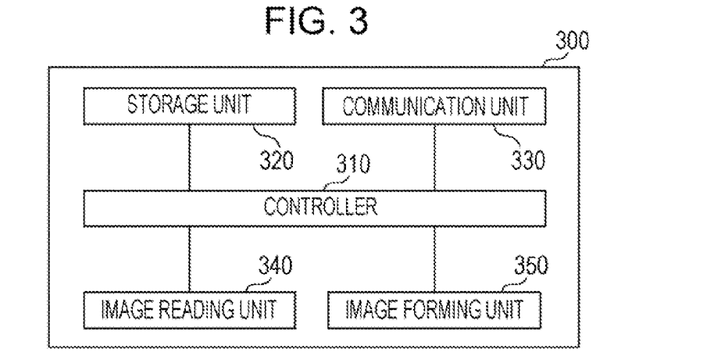
FIG. 3 is a block diagram illustrating an exemplary hardware configuration of an electronic apparatus.

FIG. 3 is a block diagram illustrating an exemplary hardware configuration of an electronic apparatus 300. As described above, an electronic apparatus 300 is not limited to a specific apparatus. Herein, an exemplary configuration of a so-called multi-function device is taken as an example. A multi-function device herein is an image forming apparatus having a scanning function of reading out a document, and a facsimile function of performing facsimile communication.

An electronic apparatus 300 includes a controller 310, a storage unit 320, a communication unit 330, an image reading unit 340, and an image forming unit 350. The controller 310 controls operations of the units of the electronic apparatus 300. The controller 310, which includes an arithmetic processing unit, such as a CPU or an application specific integrated circuit (ASIC), and a memory, performs control by executing programs. The storage unit 320 stores data. The storage unit 320 may store, for example, operation state data described below. The communication unit 330 receives/transmits data from/to the management apparatus 100, another electronic apparatus 300, or the external network 20.

The image reading unit 340 optically reads out a document. The image reading unit 340, which includes an imaging device such as a charge coupled device (CCD) image sensor, generates image data representing a document through photoelectric conversion. The image forming unit 350 forms an image corresponding to the image data. The image forming unit 350 forms an image on a recording medium, such as a sheet of paper, through, for example, electrophotographic processes (charging, exposure, developing, transfer, and fixing). The recording system used in the image forming unit 350 is not limited to an electrophotographic system, and may be an inkjet system or a thermal transfer system. An image formed by the image forming unit 350 may be monochrome or colored.

The hardware configuration of the power management system 10 is described. In this configuration, the management apparatus 100 manages the amount of electricity used, i.e., the total of the amounts of electricity used in the apparatuses, in the power management system 10. The relay apparatuses 200 and the electronic apparatuses 300 transmit pieces of operation state data indicating their states to the management apparatus 100 when necessary. The management apparatus 100 sums up the pieces of operation state data transmitted from the apparatuses, and performs processing according to the summed-up result.

When a certain condition is satisfied, the management apparatus 100 changes the control mode of the relay apparatuses 200 and the electronic apparatuses 300. The condition, in accordance with which the control mode is changed, is, for example, that the amount of electricity used in the power management system 10 exceeds a predetermined threshold. Alternatively, when the management apparatus 100 receives information indicating that the supply-demand condition of power is tight (or in contrast, information indicating that the tight supply-demand condition of power is eased), from another apparatus via the external network 20, the management apparatus 100 may change the control mode of the electronic apparatuses 300.

Figure 4:
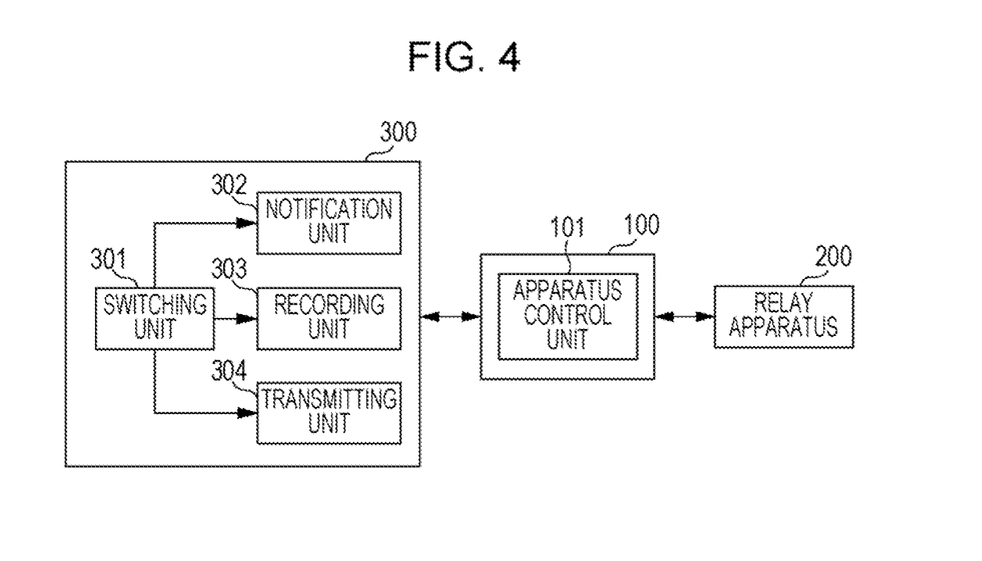
FIG. 4 is a block diagram illustrating the functional configuration of the management apparatus and an electronic apparatus.

FIG. 4 is a block diagram illustrating the functional configuration which relates to the change of the control mode which is performed between the management apparatus 100 and an electronic apparatus 300. FIG. 4 illustrates the configuration in which the management apparatus 100 and the electronic apparatus 300 receive/transmit data from/to each other directly, not via a relay apparatus 200. However, this is just a convenient illustration for describing the flow of operations, and communication is actually performed via a relay apparatus 200.

As illustrated in FIG. 4, the electronic apparatus 300 serves as a switching unit 301, a notification unit 302, a recording unit 303, and a transmitting unit 304. The management apparatus 100 serves as an apparatus control unit 101. These units are specifically achieved by using programs executed by the controller 310 of the electronic apparatus 300 and the controller 110 of the management apparatus 100.

The switching unit 301 switches the control mode of the electronic apparatus 300. The switching unit 301 switches the control mode in accordance with an instruction from the management apparatus 100. The instruction from the management apparatus 100 is an instruction to switch the control mode from the normal mode to the power-saving mode, or an instruction to switch the control mode from the power-saving mode to the normal mode. Such an instruction is hereinafter referred to as a "switching instruction".

The notification unit 302 notifies the management apparatus 100 of the state of the electronic apparatus 300. When the control mode of the electronic apparatus 300 is the normal mode, the notification unit 302 transmits a notification of the state of the electronic apparatus 300 at predetermined timings or in accordance with a change in the state. Specifically, the notification unit 302 transmits operation state data via the communication unit 330, thereby providing a notification of the state of the electronic apparatus 300. The operation state data includes at least data indicating a power value (whose unit is watt) representing power consumed in the operation of the electronic apparatus 300, and data indicating a time of day. The operation state data may include, for example, data indicating the operation state of the electronic apparatus 300. The operation state indicates, for example, the on/off state of the fixing apparatus or the on/off state of the CPU when the electronic apparatus 300 is an electrophotographic image forming apparatus. A unit which transmits operation state data is also provided for a relay apparatus 200.

The recording unit 303 records the state of the electronic apparatus 300. When the control mode of the electronic apparatus 300 is the power-saving mode, the recording unit 303 records the state of the electronic apparatus 300 in the storage unit 320 so that operation state data is transmitted when necessary. In the power-saving mode, the notification unit 302 transmits no notifications to the management apparatus 100.

The transmitting unit 304 transmits switching information for switching the control mode of relay apparatuses 200 to the management apparatus 100. The transmitting unit 304 transmits switching information for switching the control mode of relay apparatuses 200 from the normal mode to the power-saving mode, to the management apparatus 100 in response to switching of the control mode of the electronic apparatus 300 from the normal mode to the power-saving mode.

The apparatus control unit 101 switches the control mode of apparatuses. The apparatus control unit 101 requests an electronic apparatus 300 to switch the control mode of the electronic apparatus 300 when the control mode of the electronic apparatus 300 is to be switched. Receiving the switching information from the electronic apparatus 300, the apparatus control unit 101 switches the control mode of relay apparatuses 200 which relay communication between the electronic apparatus 300 and the management apparatus 100, from the normal mode to the power-saving mode. The apparatus control unit 101 is a unit which controls the relay apparatuses 200, and is also a unit which controls the electronic apparatuses 300. These units may be separately provided.

In the exemplary embodiment, some electronic apparatuses 300 are capable of operating in the power-saving mode, and the others are not. The electronic apparatuses 300 which are capable of operating in the power-saving mode record their states in the power-saving mode without notifying the management apparatus 100 of their states. When the control mode of the electronic apparatuses 300 is switched from the power-saving mode to the normal mode, the electronic apparatuses 300 notify the management apparatus 100 of their states which have been recorded till that time. In contrast, the electronic apparatuses 300 which are not capable of operating in the power-saving mode have no functions of recording their states. Such electronic apparatuses 300 need to notify the management apparatus 100 of their states every time the states are to be transmitted.

Therefore, the relay apparatuses 200 which relay communication between the management apparatus 100 and the electronic apparatuses 300 which are not capable of operating in the power-saving mode need to be in a state in which communication is allowed, and it is not possible for the relay apparatuses 200 to be turned off. Such relay apparatuses 200 are not switched to the power-saving mode, and operate still in the normal mode. In contrast, the relay apparatuses 200 which relay communication between the management apparatus 100 and the electronic apparatuses 300 which are capable of operating in the power-saving mode do not always need to be in a state in which communication is allowed, and stay at least in a state in which only minimum power with which the relay apparatuses 200 are switched back to the normal mode is consumed. The control mode of such relay apparatuses 200 is switched from the normal mode to the power-saving mode when necessary. The relay apparatuses 200 which go into the state in which minimum power is consumed cause the power consumption to be lower than that in the case where the relay apparatuses 200 remain in the state in which communication is allowed.

Figure 5:
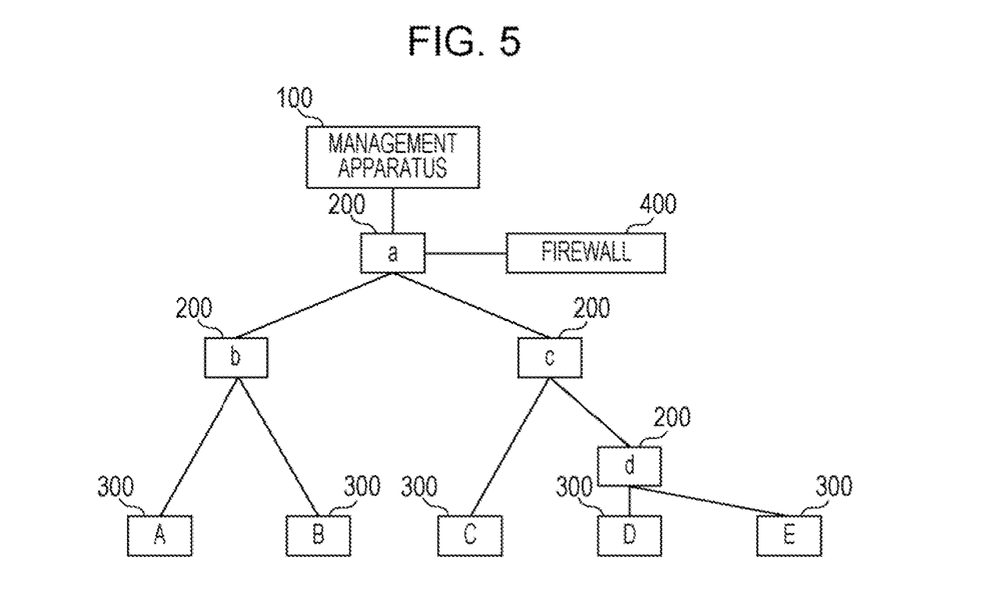
FIG. 5 is a diagram illustrating an exemplary network configuration of the power management system.

FIG. 5 is a diagram illustrating an exemplary network configuration of the power management system 10. Herein, for convenience of explanation, the relay apparatuses 200 are located at positions a, b, c, and d, and the electronic apparatuses 300 are located at positions A, B, C, D, and E. In this example, an electronic apparatus 300 located at A (hereinafter, referred to as the "electronic apparatus A", and the same is true for the other electronic apparatuses 300 and the relay apparatuses 200) and the electronic apparatus B communicate with the management apparatus 100 via the relay apparatuses a and b. The electronic apparatus C communicates with the management apparatus 100 via the relay apparatuses a and c. The electronic apparatuses D and E communicate with the management apparatus 100 via the relay apparatuses a, c, and d. The relay apparatus a is also connected to the firewall 400, and is not switched to the power-saving mode.

When all of the electronic apparatuses A to E are capable of operating in the power-saving mode, it is possible for all of the relay apparatuses b, c, and d to operate in the power-saving mode. In contrast, when the electronic apparatus A is not capable of operating in the power-saving mode, the relay apparatus b needs to remain in the normal mode in order to provide a communication path to the management apparatus 100. Similarly, when the electronic apparatus E is not capable of operating in the power-saving mode, the relay apparatuses c and d need to remain in the normal mode.

Figure 6:
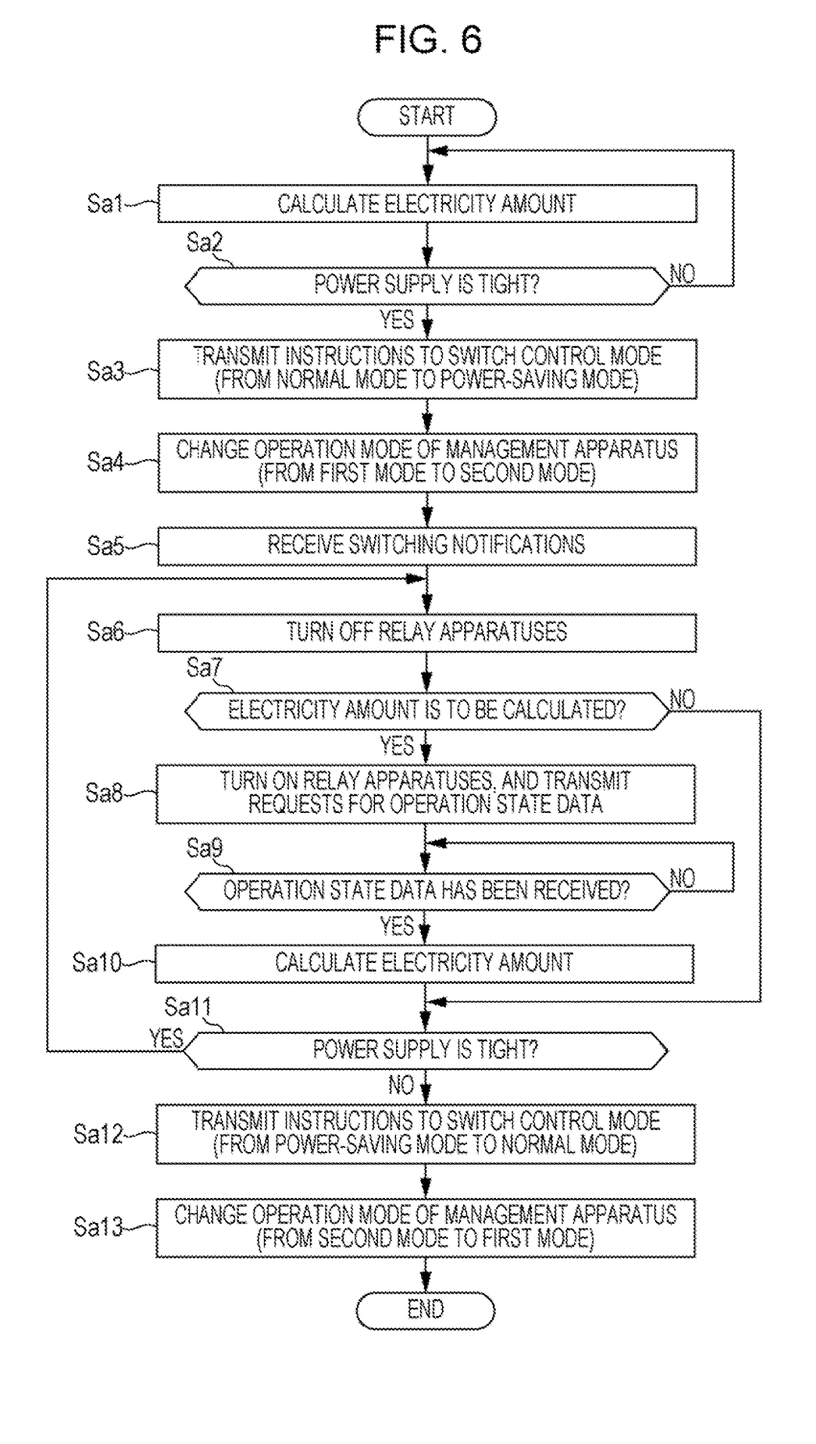
FIG. 6 is a flowchart of a process performed by the management apparatus.

FIG. 6 is a flowchart of a process performed by the management apparatus 100. The controller 110 of the management apparatus 100 sums up the amounts of electricity used in the units included in the power management system 10, thereby calculating the amount of electricity used in the entire power management system 10 (in step Sa1). The controller 110 sums up the amounts of electricity on the basis of pieces of operation state data transmitted from the electronic apparatuses 300 and the relay apparatuses 200.

The controller 110 determines whether or not the amount of electricity calculated in step Sa1 exceeds a predetermined threshold, so as to determine whether or not the power supply is tight (in step Sa2). While the amount of electricity used is equal to or less than the predetermined threshold, the controller 110 repeatedly performs only steps Sa1 and Sa2 at predetermined time intervals (such as every five minutes or every ten minutes), and does not perform the processes described below.

In contrast, if the amount of electricity used exceeds the predetermined threshold, the controller 110 transmits switching instructions to switch the control mode to the electronic apparatuses 300 (in step Sa3). As described in the example in FIG. 5, not all of the electronic apparatuses 300 perform switching of the control mode. Then, the controller 110 changes the operation mode of the management apparatus 100 from the first mode to the second mode (in step Sa4). Whereas calculating the amount of electricity at predetermined time intervals in the first mode, the management apparatus 100 calculates the amount of electricity only when necessary in the second mode. The term "when necessary" may indicate, for example, a time interval longer than that in the first mode.

The controller 110 receives switching notifications of the control mode from the electronic apparatuses 300 (in step Sa5). A switching notification indicates that the control mode has been switched, and corresponds to exemplary "switching information" in the present invention. At that time, only electronic apparatuses 300 which have switched the control mode to the power-saving mode transmit the switching notifications.

In response to reception of the switching notifications, the controller 110 switches the control mode of the relay apparatuses 200 to the power-saving mode (in step Sa6). In the exemplary embodiment, to do this, the controller 110 turns off relay apparatuses 200. The controller 110 determines relay apparatuses 200 whose control mode is to be switched, on the basis of the switching notifications received in step Sa5. Specifically, while the controller 110 maintains communication paths to electronic apparatuses 300 which have not transmitted switching notifications, the controller 110 switches the control mode of relay apparatuses 200 corresponding to the other nodes to the power-saving mode. That is, the controller 110 switches the control mode of the relay apparatuses 200 which relay only the communication to the electronic apparatuses 300 which have transmitted the switching notifications to the power-saving mode. The controller 110 specifies the network configuration on the basis of the topology information stored in the storage unit 120, and determines the relay apparatuses 200 whose control mode is to be switched.

Thus, after the control mode of (some of) the relay apparatuses 200 and the electronic apparatuses 300 is switched to the power-saving mode, the controller 110 calculates the amount of electricity only when necessary. Specifically, the controller 110 determines whether or not the amount of electricity used is to be calculated (in step Sa7). Only when necessary, the controller 110 temporarily turns on the relay apparatuses 200, and requests the relay apparatuses 200 and the electronic apparatuses 300 to transmit operation state data (in step Sa8). The controller 110 determines whether or not pieces of operation state data are received from all of the relay apparatuses 200 and the electronic apparatuses 300 which are to be managed (in step Sa9), and calculates the amount of electricity when all of the pieces of operation state data which are necessary for the calculation are received (in step Sa10). If the controller 110 determines that the amount of electricity used does not need to be calculated in step Sa7, the controller 110 skips steps Sa8, Sa9, and Sa10.

The controller 110 determines whether or not the power supply is tight again (in step Sa11). This determination is similar to that in step Sa2. If the power supply still remains tight, the controller 110 turns off again the relay apparatuses 200 which have been temporarily turned on in step Sa8 (in step Sa6), and repeats step Sa7 and its subsequent steps. In the case where step Sa8 is skipped, the controller 110 may skip step Sa6.

In step Sa11, if the controller 110 determines that the power supply is not tight, the controller 110 transmits switching instructions to switch the control mode to the electronic apparatuses 300 (in step Sa12). At that time, the controller 110 causes the control mode to be switched from the power-saving mode to the normal mode. Then, the controller 110 switches the control mode of the management apparatus 100 from the second mode to the first mode (in step Sa13).

Figure 7:
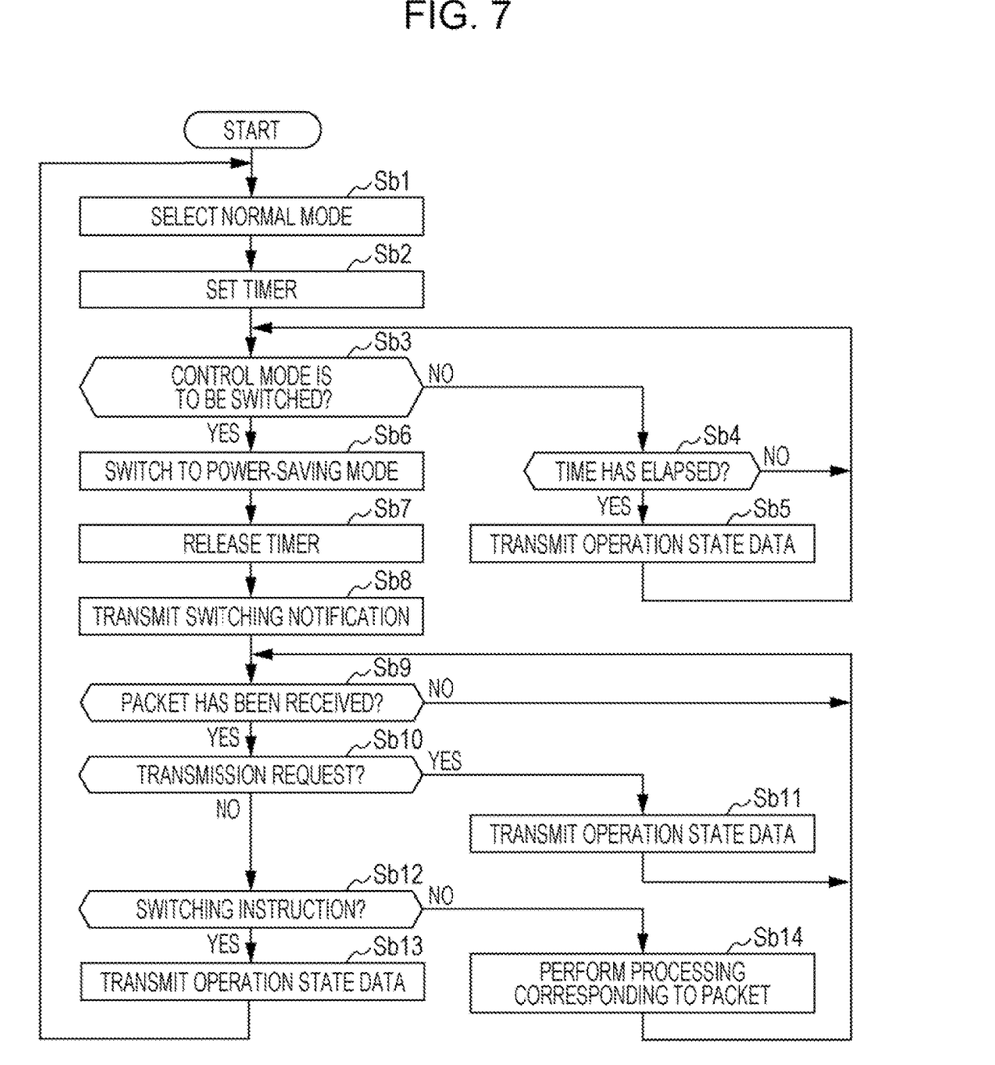
FIG. 7 is a flowchart of a process performed by an electronic apparatus.

FIG. 7 is a flowchart of a process performed by an electronic apparatus 300 which is capable of operating in the power-saving mode. The flowchart in FIG. 7 is executed in response to the process performed by the management apparatus 100 illustrated in FIG. 6. The controller 310 of the electronic apparatus 300 selects the normal mode as the control mode (in step Sb1). In the normal mode, the controller 310 sets a timer so as to transmit operation state data at predetermined time intervals (in step Sb2). The time which is set to the timer corresponds to the time intervals at which the management apparatus 100 calculates the amount of electricity used (see steps Sa1 and Sa2 in FIG. 6).

The controller 310 determines whether or not a switching instruction (see step Sa3 in FIG. 6) has been transmitted from the management apparatus 100, so as to determine whether or not the control mode is to be switched (in step Sb3). Until reception of a switching instruction, the controller 310 transmits operation state data at the predetermined time intervals. That is, the controller 310 determines whether or not the time which is set to the timer has elapsed (in step Sb4). If the time has elapsed, the controller 310 transmits operation state data (in step Sb5).

If a switching instruction has been received, the controller 310 switches the control mode to the power-saving mode (in step S06). In the power-saving mode, the controller 310 releases the timer which has been set in step Sb2 (in step Sb7). This is because the controller 310 transmits operation state data not at the predetermined time intervals, but only when a transmission request (see step Sa8 in FIG. 6) is received from the management apparatus 100, in the power-saving mode. The controller 310 transmits a switching notification (see step Sa5 in FIG. 6) indicating that the control mode has been switched, to the management apparatus 100 (in step Sb8).

As illustrated in FIG. 6, in response to reception of this switching notification, the management apparatus 100 turns off the relay apparatuses 200 (see steps Sa5 and Sa6). Accordingly, after transmission of the switching notification, the electronic apparatus 300 is in a state in which network connection is interrupted. The electronic apparatus 300 does not delete an address resolution protocol (ARP) table and maintains the table so as to hold connection information about connection to the management apparatus 100. The connection information which is held causes elimination of a need to perform address resolution when the network connection is established again. Therefore, power required for the address resolution is not necessary.

After transmission of the switching notification, the controller 310 does not need to transmit operation state data until the management apparatus 100 transmits a request to transmit operation state data. In this state, when, for example, a user operation causes the state of the electronic apparatus 300 to be changed, the controller 310 records this change. Specifically, the controller 310 detects a change in the state of the electronic apparatus 300. When the state of the electronic apparatus 300 is changed, the controller 310 records the situation and the time at that time. Hereinafter, this record is referred to as an "operation state log".

After transmission of the switching notification, the controller 310 determines whether or not any packet has been received (in step Sb9). Reception of a packet means that the network connection which has been interrupted by the management apparatus 100 is re-established. The controller 310 repeats this determination until any packet is received. Upon reception of a packet, the controller 310 performs processing corresponding to the received packet.

The controller 310 determines whether or not the received packet indicates a request (see step Sa8 in FIG. 6) to transmit operation state data (in step Sb10). If the received packet indicates a request to transmit operation state data, the controller 310 transmits operation state data which is information until the transmission request is received (in step Sb11). The operation state data is generated on the basis of the above-described operation state log.

The controller 310 determines whether or not the received packet indicates a switching instruction (see step Sa12 in FIG. 6) to switch the control mode (in step Sb12). If the received packet indicates a switching instruction to switch the control mode, the controller 310 transmits operation state data which is information until the switching instruction is received (in step Sb13). At that time, the controller 310 performs step Sb1 to switch the control mode from the power-saving mode to the normal mode, and performs step Sb2 and its subsequent steps again.

If the received packet is not a transmission request nor a switching instruction, the controller 310 performs other processing corresponding to the received packet (in step Sb14). For example, the controller 310 responds to a ping packet, or responds to an ARP request packet. The controller 310 may discard a packet whose destination is not the electronic apparatus 300.

Through the above-described operation, in the power management system 10, the relay apparatuses 200 which relay communication between the management apparatus 100 and an electronic apparatus 300 which operates in the power-saving mode, that is, in a control mode in which the state of the electronic apparatus 300 is recorded, but not transmitted, are turned off when necessary. Thus, the amount of electricity used in the entire power management system 10 is less than that in the case where the relay apparatuses 200 are not turned off.

Such an operation is achieved by using the electronic apparatuses 300 transmitting switching notifications. This is because, if the management apparatus 100 receives no switching notifications, it is not possible to specify which electronic apparatus 300 is capable of operating in the power-saving mode and which relay apparatus 200 is to be turned off. That is, a switching notification which is exemplary switching information in the present invention may be information for specifying relay apparatuses 200 which may be turned off.

Modified Exemplary Embodiments

An exemplary embodiment of the present invention is not limited to the above-described exemplary embodiment, and may be, for example, a modified exemplary embodiment described below. In addition, modified exemplary embodiments may be combined with each other by merging them or replacing a part of a modified exemplary embodiment with another, when necessary.

First Modified Exemplary Embodiment

In the above-described exemplary embodiment, as illustrated in FIG. 7, an electronic apparatus 300 transmits operation state data at predetermined timings in the normal mode. The electronic apparatus 300 may transmit operation state data in accordance with a change in the state of the electronic apparatus 300, not at predetermined timings. In the case where the electronic apparatus 300 operates like this, it is not necessary for the electronic apparatus 300 to set the timer. Instead of the determination using the time which is set to the timer (in step Sb4), the electronic apparatus 300 determines whether or not the state of the electronic apparatus 300 has been changed. If the state of the electronic apparatus 300 has been changed, the electronic apparatus 300 may transmit operation state data.

Second Modified Exemplary Embodiment

A relay apparatus 200 does not necessarily need to be turned off in the power-saving mode. In the power-saving mode, when the relay apparatus 200 enters a state in which the power consumption is lower than that in the normal mode, switching of the control mode causes a change in power consumption, and the amount of electricity used in the entire power management system 10 is less than that in the case where the power-saving mode is not used.

Third Modified Exemplary Embodiment

An electronic apparatus 300 may have limited functions in the power-saving mode compared with those in the normal mode. For example, when the electronic apparatus 300 is a multi-function device, some functions, such as a facsimile function, may be disabled in the power-saving mode. When the electronic apparatus 300 is a color printer, color printing may be inhibited in the power-saving mode, and only monochrome printing may be enabled. A function limited in the power-saving mode may be a function whose power consumption is relatively large.

Fourth Modified Exemplary Embodiment

Operation state data may include information, on the basis of which a power value is calculated, instead of an actual power value. That is, operation state data may include at least only information from which the amount of electricity used may be calculated. When an electronic apparatus 300 is a lighting apparatus in which brightness is adjustable, operation state data may include information indicating brightness which is set. When an electronic apparatus 300 is an air-conditioning apparatus, operation state data may include a preset temperature, a room temperature, and a strength of wind. In this case, the management apparatus 100 may calculate an actual power value on the basis of the operation state data.

Fifth modified exemplary embodiment

It is not necessary for the management apparatus 100 to receive operation state data from all of the apparatuses to be managed. For example, in the case where the power consumption of an electronic apparatus 300 hardly changes during the operation and where it is possible for the power value of the electronic apparatus 300 to be almost correctly predicted, no operation state data may be received from the electronic apparatus 300, and the power value may be predicted.

Sixth Modified Exemplary Embodiment

The present invention may be provided as a program for causing a computer to achieve the functions of an electronic apparatus according to the present invention, or may be provided through a recording medium in which the program is recorded. The program according to the present invention may be obtained from an external apparatus through a network or another communication unit, and may be downloaded to an electronic apparatus.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A power management system comprising:
   an electronic apparatus;
   a management apparatus; and
   a relay apparatus that relays communication between the electronic apparatus and the management apparatus,
   wherein the electronic apparatus includes a notification unit that notifies the management apparatus of a state of the electronic apparatus at predetermined timings or in accordance with a change in the state of the electronic apparatus, in the case where a control mode of the electronic apparatus is a first mode, a recording unit that records the state instead of transmitting the notification by the notification unit, in the case where the control mode is a second mode, a switching unit that switches the control mode in response to an instruction from the management apparatus, and a transmitting unit that transmits switching information to the management apparatus for switching a control mode of relay apparatus from the first mode to the second mode in response to switching of the control mode of the electronic apparatus from the first mode to the second mode which is performed by the switching unit, and wherein the management apparatus includes an apparatus control unit that, in response to receiving the switching information transmitted by the transmitting unit, switches a control mode of the relay apparatus from the first mode to the second mode so as to cause a power consumption of the relay apparatus to be lower than a power consumption before the switching so that rely apparatus stays at least in a state in which only minimum power with which the relay apparatuses are switched back to the first mode is consumed.

2. The power management system according to claim 1, wherein the notification unit transmits a notification of the state recorded by the recording unit when the switching unit switches the control mode from the second mode to the first mode.

3. The power management system according to claim 1, wherein the apparatus control unit turns off the relay apparatus when the switching information is received.

4. The power management system according to claim 2, wherein the apparatus control unit turns off the relay apparatus when the switching information is received.

5. The power management system according to claim 3, wherein, in the case where the control mode of the electronic apparatus is the second mode, the apparatus control unit temporarily turns on the relay apparatus when the recorded state is to be obtained from the electronic apparatus.

6. The power management system according to claim 4, wherein, in the case where the control mode of the electronic apparatus is the second mode, the apparatus control unit temporarily turns on the relay apparatus when the recorded state is to be obtained from the electronic apparatus.

7. An electronic apparatus comprising:
a notification unit that notifies a management apparatus of a state of the electronic apparatus at predetermined timings or in accordance with a change in the state of the electronic apparatus, in the case where a control mode of the electronic apparatus is a first mode;

a recording unit that records the state instead of transmitting the notification by the notification unit, in the case where the control mode is a second mode;

a switching unit that switches the control mode in response to an instruction from the management apparatus; and a transmitting unit that transmits switching information to the management apparatus for switching a control mode of a relay apparatus that relays communication between the electronic apparatus and the management apparatus, from the first mode to the second mode in response to switching of the control mode of the electronic apparatus from the first mode to the second mode which is performed by the switching unit, wherein, in response to receiving the switching information transmitted by the transmitting unit, a control mode of the relay apparatus is switched from the first mode to the second mode so as to cause a power consumption of the relay apparatus to be lower than a power consumption before the switching of the control mode of the relay apparatus so that relay apparatus stays at least in a state in which only minimum power with which the relay apparatuses are switched back to the first mode is consumed.

8. A non-transitory computer readable medium storing a program causing a computer in an electronic apparatus to execute a process comprising:

notifying a management apparatus of a state of the electronic apparatus at predetermined timings or in accordance with a change in the state of the electronic apparatus, in the case where a control mode of the electronic apparatus is a first mode;

recording the state instead of transmitting the notification, in the case where the control mode is a second mode;

switching the control mode in response to an instruction from the management apparatus;

transmitting switching information to the management apparatus for switching a control mode of a relay apparatus that relays communication between the electronic apparatus and the management a apparatus, from the first mode to the second mode in response to switching of the control mode from the first mode to the second mode; and switching, in response to receiving the switching information, a control mode of the relay apparatus from the first mode to the second mode so as to cause a power consumption of the relay apparatus to be lower than a power consumption before the switching of the control mode of the relay apparatus so that relay apparatus stays at least in a state in which only minimum power with which the relay apparatuses are switched back to the first mode is consumed.

* * * * *